(12) United States Patent
Yeh (10) Patent No.: US 11,252,269 B2
(45) Date of Patent: Feb. 15, 2022

(54) MOBILE ELECTRONIC DEVICE

(71) Applicant: Getac Technology Corporation, Hsinchu County (TW)

(72) Inventor: Hsi-Yang Yeh, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 7 days.

(21) Appl. No.: 16/890,291

(22) Filed: Jun. 2, 2020

(65) Prior Publication Data
US 2021/0377373 A1   Dec. 2, 2021

(51) Int. Cl.
*H04M 1/02* (2006.01)
*G06K 7/00* (2006.01)
*H01M 50/20* (2021.01)

(52) U.S. Cl.
CPC ........ *H04M 1/0262* (2013.01); *G06K 7/0021* (2013.01); *G06K 7/0034* (2013.01); *G06K 7/0086* (2013.01); *H01M 50/20* (2021.01); *H04M 1/0254* (2013.01); *H04M 2250/14* (2013.01)

(58) Field of Classification Search
CPC .. H04M 1/0262; H04M 50/20; H04M 1/0254; H04M 2250/14; G06K 7/0021; G06K 7/0034; G06K 7/0086
See application file for complete search history.

(56) References Cited

FOREIGN PATENT DOCUMENTS

CN           2708515 Y   *  6/2005
KR       101542458 B1   *  7/2015

* cited by examiner

*Primary Examiner* — Ankur Jain
*Assistant Examiner* — Angelica M Perez
(74) *Attorney, Agent, or Firm* — Locke Lord LLP; Tim Tingkang Xia, Esq.

(57) ABSTRACT

A mobile electronic device includes a main framework, back cover, expansion box, card reading module and battery module. The main framework has a motherboard. The back cover is disposed on the main framework and has an expansion window. The expansion box covers and closes the expansion window. The expansion box has therein an expansion chamber, a power chamber, and a communication opening whereby the expansion chamber and the power chamber communicate with each other. The expansion box has a wire connection opening in communication with the power chamber and with the expansion window. The card reading module and battery module are disposed in the expansion chamber and power chamber, respectively. The card reading module is connected to the motherboard by a signal wire via the communication opening and the wire connection opening. The battery module is connected to the motherboard by a power wire via the wire connection opening.

20 Claims, 10 Drawing Sheets

MOBILE ELECTRONIC DEVICE

BACKGROUND OF THE INVENTION

Field of the Invention

The present disclosure relates to mobile electronic devices and, more particularly, to a mobile electronic device capable of expanding use of a card reading module and a battery module simultaneously.

Description of the Prior Art

Owing to their limited usage areas, conventional mobile electronic devices are not capable of multifunction expanded use. For example, conventional mobile electronic devices have to be powered by external batteries in order to prolong power supply and have to be connected to external card readers in order to read from and write to smart cards.

However, conventional mobile electronic devices are not capable of multifunction expanded use in order to be each simultaneously connected to an external battery and an external card reader. As a result, the conventional mobile electronic devices in operation must each switch between an external battery and an external card reader to the detriment of ease of use.

SUMMARY OF THE INVENTION

It is an objective of the present disclosure to provide a mobile electronic device capable of expanding use of a card reading module and a battery module simultaneously.

In order to achieve the above and other objectives, the present disclosure provides a mobile electronic device, comprising: a main framework having a motherboard; a back cover covering the main framework and having an expansion window; an expansion box disposed at the back cover, corresponding in position to the expansion window, having therein an expansion chamber and a power chamber, being in communication with a communication opening between the expansion chamber and the power chamber, having an operation opening in communication with the expansion chamber, and having a wire connection opening in communication with the power chamber, the wire connection opening being in communication with the expansion window; a card reading module disposed in the expansion chamber and connected to the motherboard by a signal wire via the communication opening and the wire connection opening; and a battery module disposed in the power chamber and connected to the motherboard by a power wire via the wire connection opening.

Compared with the prior art, the present disclosure is capable of expanding use of a card reading module and a battery module simultaneously.

DETAILED DESCRIPTION OF THE EMBODIMENTS

Objectives, features, and advantages of the present disclosure are hereunder illustrated with specific embodiments, depicted with drawings, and described below. However, the accompanying drawings are illustrative, rather than restrictive, of the present disclosure.

Figure 1:
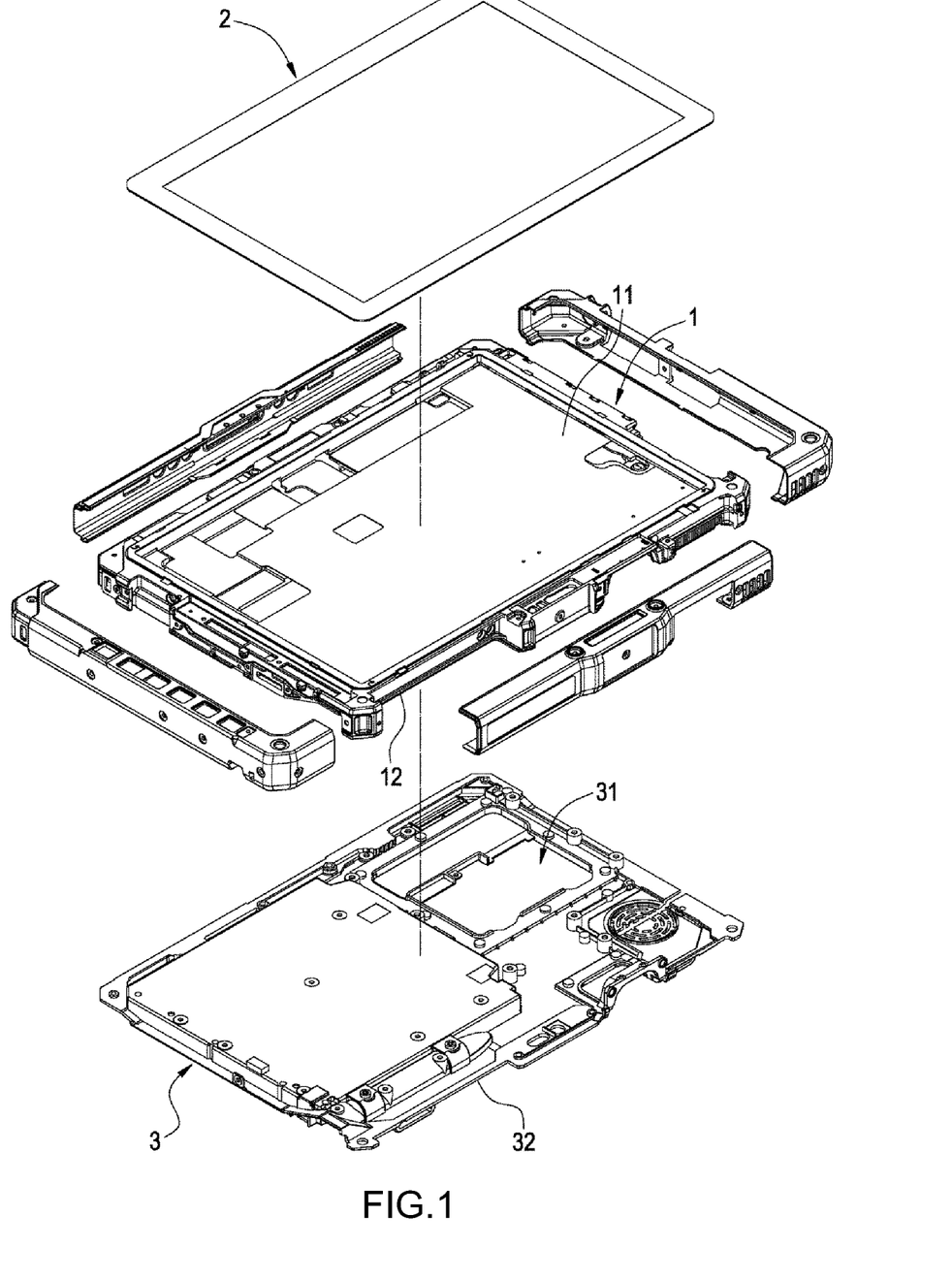
FIG. 1 is an exploded view of a mobile electronic device according to the present disclosure (without showing an expansion unit).
Figure 2:
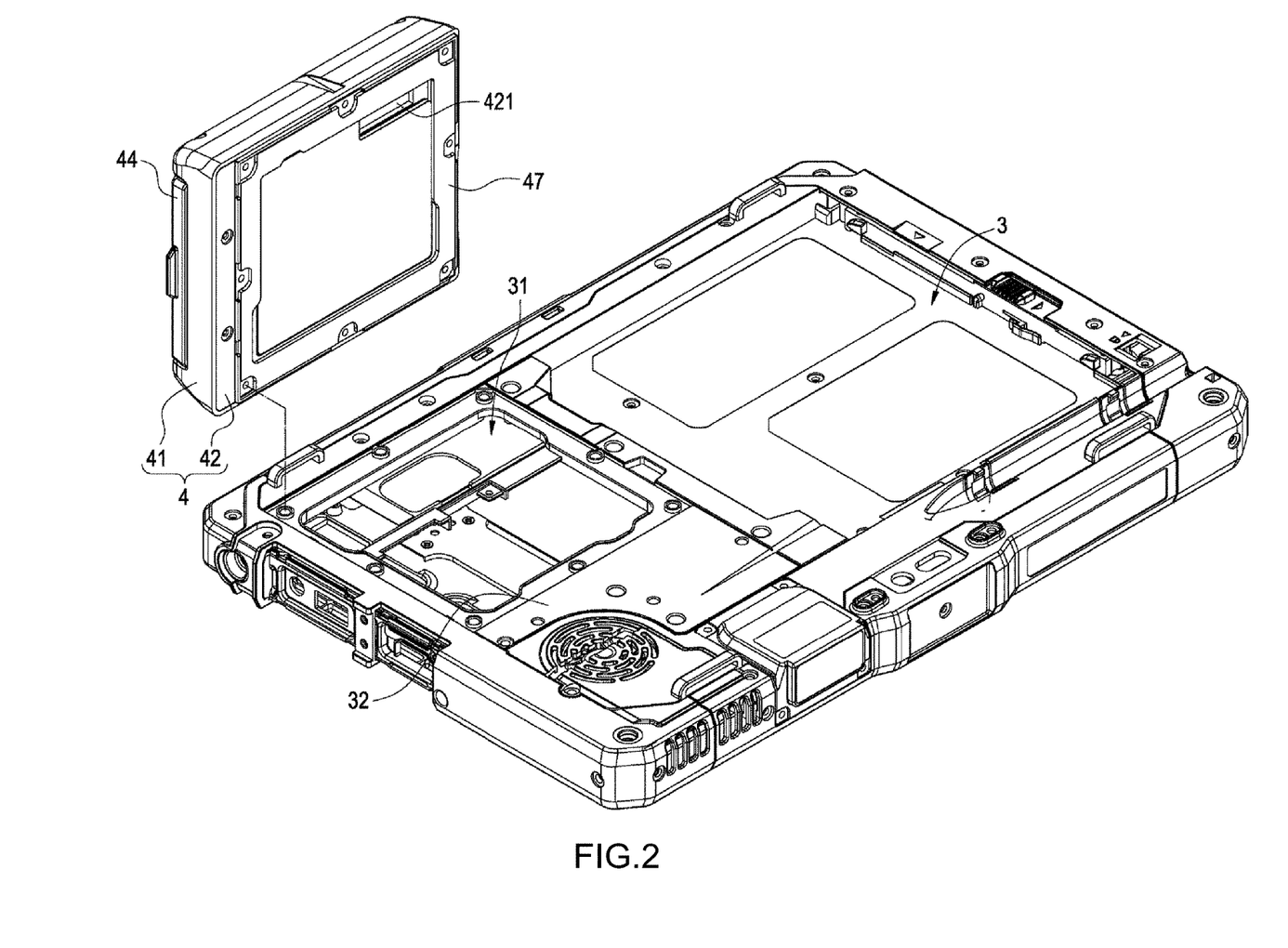
FIG. 2 is a perspective view of the mobile electronic device before having the expansion unit fixed thereto according to the present disclosure.

Referring to FIG. 1 and FIG. 2, the present disclosure provides a mobile electronic device comprising a main framework 1, a back cover 3, an expansion box 4, a card reading module 5 and a battery module 6. The mobile electronic device further comprises a touch panel 2 as needed. The expansion box 4, the card reading module 5 and the battery module 6 together form an expansion unit (not denoted by any reference numeral). Thanks to the expansion unit, the mobile electronic device is capable of expanding use of the card reading module 5 and the battery module 6.

The main framework 1 has two opposing framework surfaces 11, 12. The main framework 1 has therein a motherboard (not shown). The touch panel 2 is disposed on and fixed to the framework surface 11. In a variant embodiment not illustrated by any diagram, a display screen or any other electronic device is fixed to the framework surface 11. Therefore, the framework surfaces 11, 12 are illustrative, rather than restrictive, of the present disclosure.

The back cover 3 is disposed on and fixed to the framework surface 12, such that the back cover 3 covers the main framework 1. The back cover 3 has an expansion window 31 and has an exposed outer cover surface 32. The expansion window 31 is in communication with the main framework 1 and thus with the motherboard.

The expansion box 4 corresponds in position to the expansion window 31 and is fixed to the outer cover surface 32 of the back cover 3, and thus the expansion box 4 covers and closes the expansion window 31. Referring to FIG. 3 through FIG. 8, the expansion box 4 forms therein, in any feasible way, an expansion chamber 4a (shown in FIG. 8), a power chamber 4b (shown in FIG. 8), and a communication opening 4311 (shown in FIG. 5) whereby the expansion chamber 4a and the power chamber 4b are in communication with each other. A wire connection opening 421 (shown in FIGS. 2, 3) in communication with the power chamber 4b and an operation opening 411 (shown in FIGS. 8, 10) in communication with the expansion chamber 4a are disposed outside the expansion box 4. The wire connection opening 421 is in communication with the expansion window 31 as shown in FIG. 2.

The card reading module 5 is disposed in the expansion chamber 4a. Preferably, the card reading module 5 is disposed on and fixed to a mask body outer side 4312. The battery module 6 is disposed in the power chamber 4b, such that the expansion box 4, the card reading module 5 and the battery module 6 together form the expansion unit. The card reading module 5 is connected to the motherboard by a signal wire (not shown) via the communication opening 4311 and the wire connection opening 421. The battery module 6 is connected to the motherboard by a power wire (not shown) via the wire connection opening 421. Therefore, both the signal wire and power wire are electrically connected to the motherboard via the wire connection opening 421.

Since both the card reading module 5 and the battery module 6 are electrically connected to the motherboard to allow the mobile electronic device of the present disclosure to attain multifunction expansion usage, including prolonging power supply by the battery module 6, using the card reading module 5 to handle various cards (for example, smart cards) which are readable and writable, and especially expanding use of the battery module 6 and the card reading module 5 simultaneously. Furthermore, the expansion unit thus formed may also work independently, for example, for use as mobile power (when starting the power module 6) independently or for functioning as a card reader (when starting the card reading module 5) independently.

Figure 8:
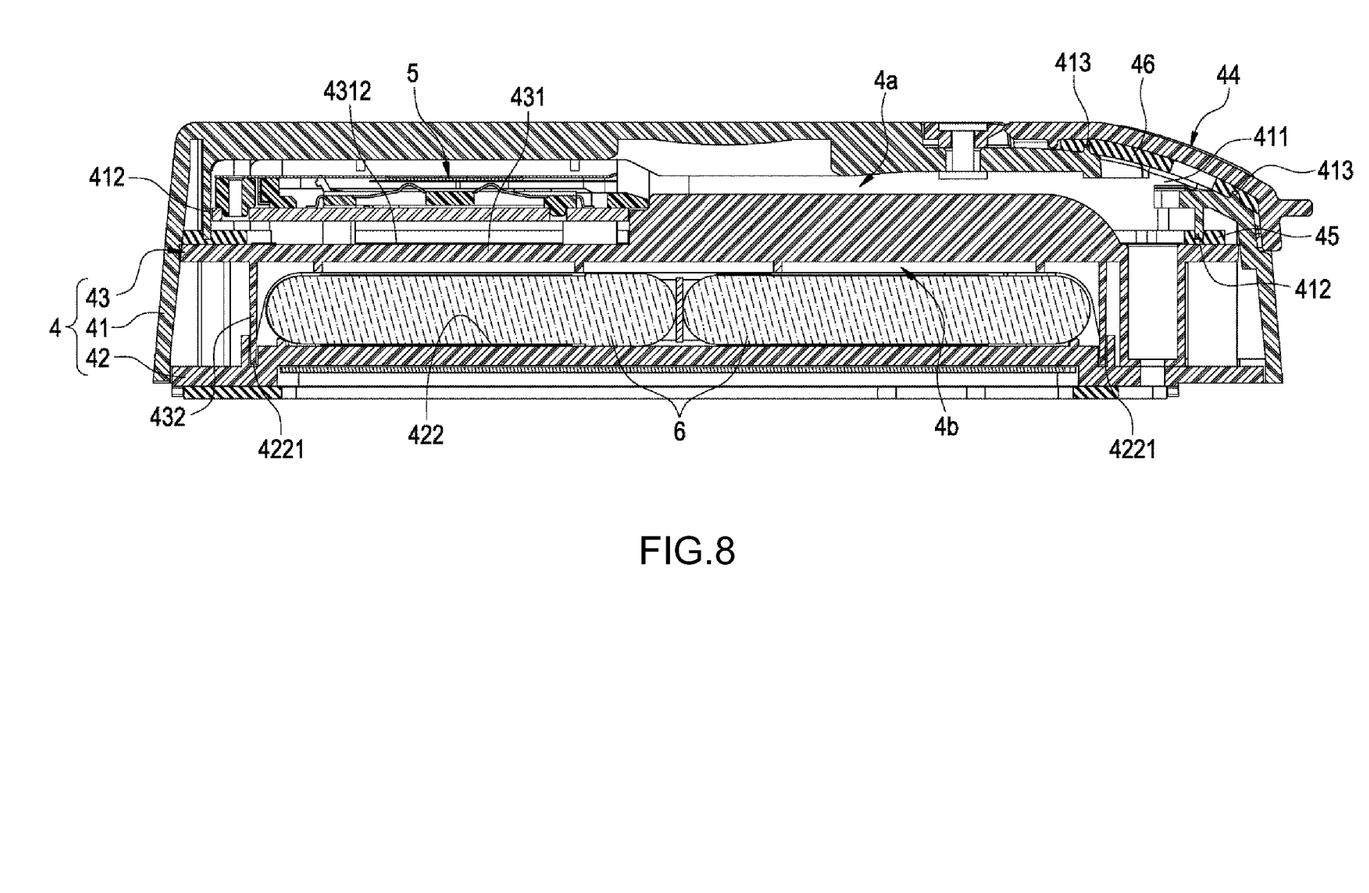
FIG. 8 is a cross-sectional view based on FIG. 7 according to the present disclosure.

The present disclosure is not restrictive of the way of forming the expansion chamber 4a (shown in FIG. 8), the power chamber 4b, the communication opening 4311 and the wire connection opening 421 of the expansion box 4. In this embodiment, for an exemplary purpose, the expansion box 4 comprises a first casing 41, a second casing 42 and a mask body 43. The first casing 41 and the second casing 42 are coupled together to form a housing. The housing has therein an intrabox space 40 (shown in FIG. 4). Within the intrabox space 40, the mask body 43 covers the second casing 42 and is fixed thereto, so as to form the power chamber 4b between the inner side (not denoted by any reference numeral) of the mask body and the second casing 42 and form the expansion chamber 4a between the first casing 41 and the mask body outer side 4312. Referring to FIG. 8, the battery module 6 is preferably fitted between the mask body 43 and the second casing 42 and thus positioned therebetween.

Figure 5:
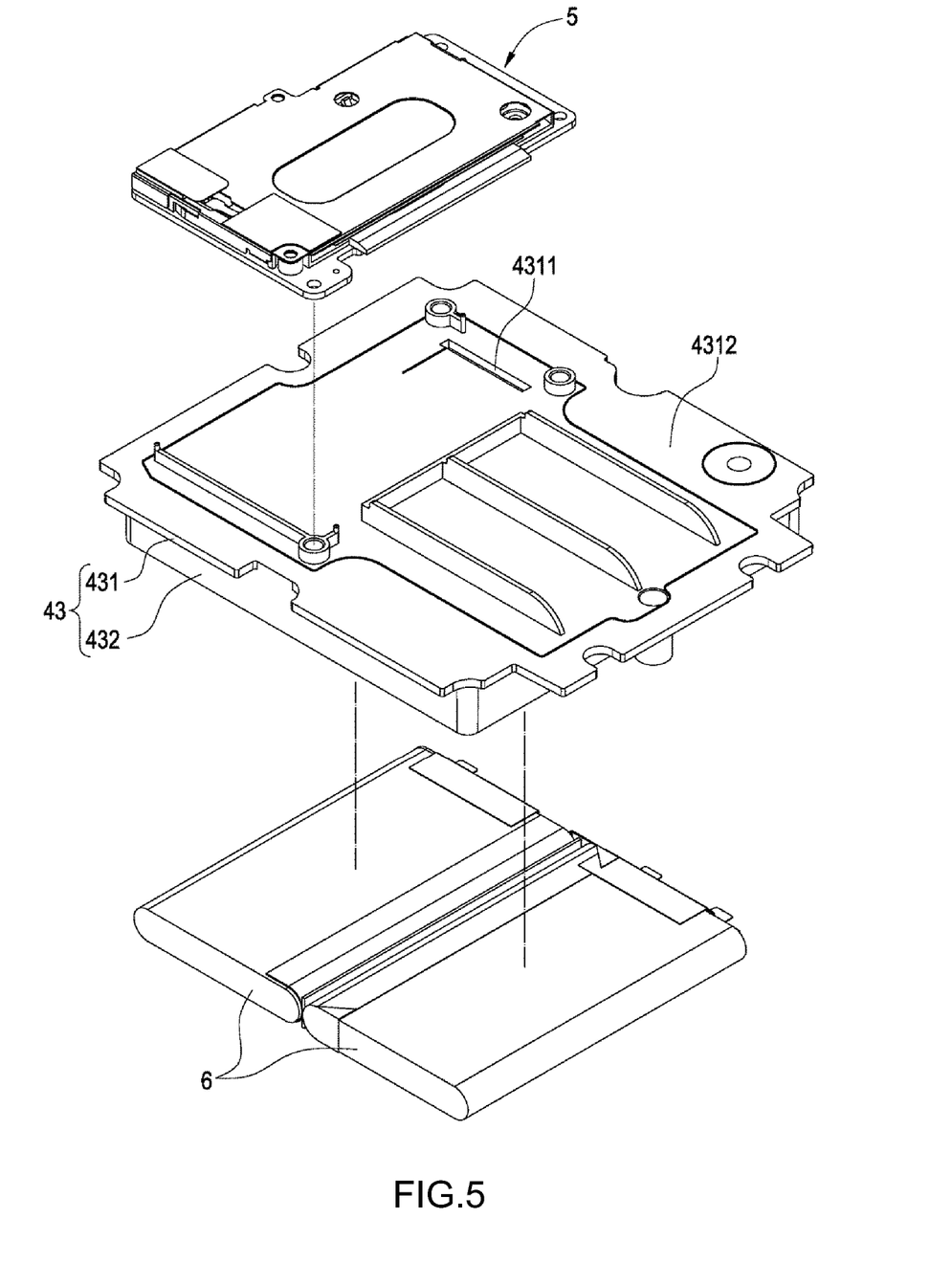
FIG. 5 is an exploded view from one angle, showing a mask body, card reading module and battery module of FIGS. 3, 4, according to the present disclosure.
Figure 6:
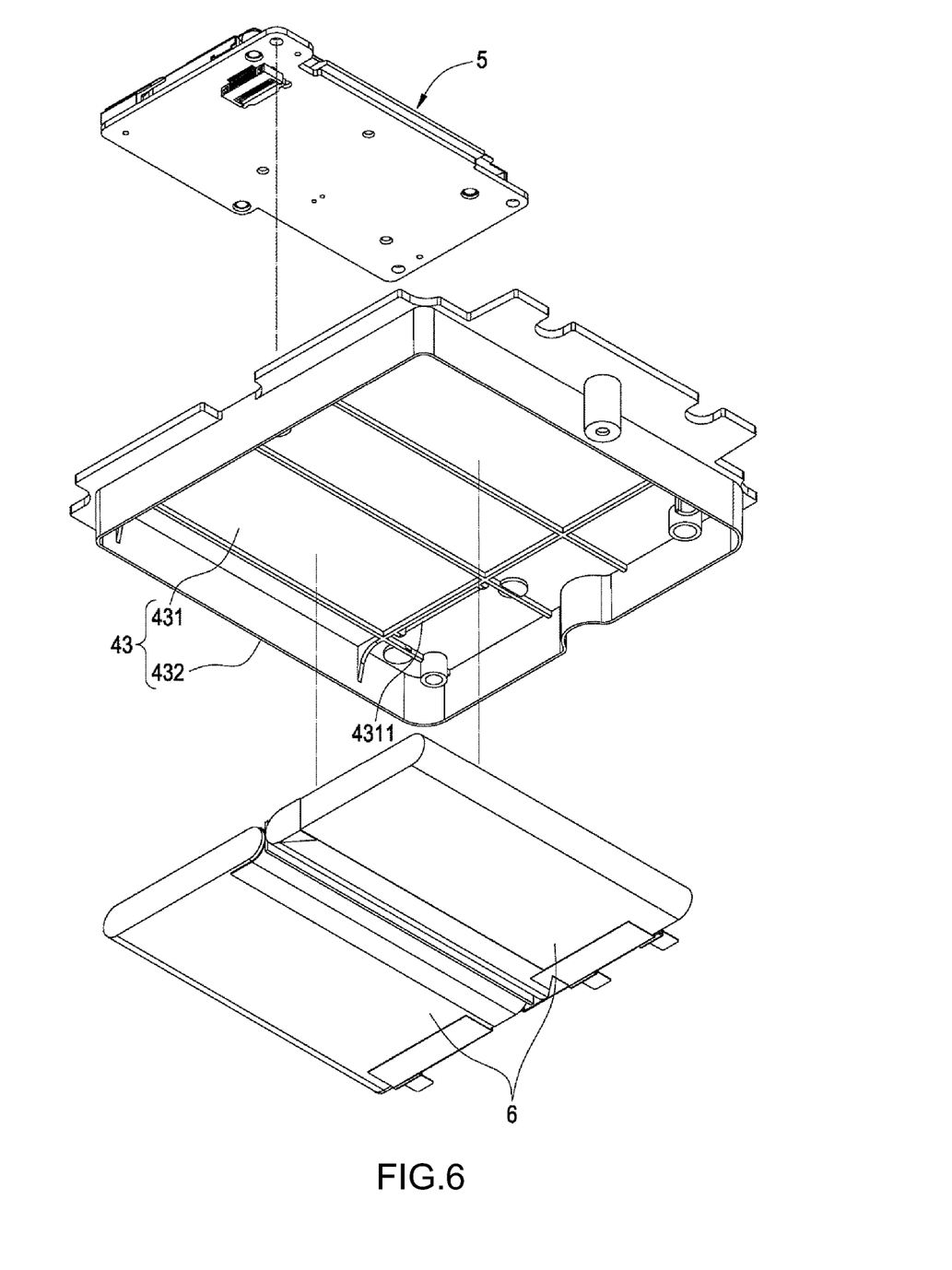
FIG. 6 is an exploded view from another angle, showing the mask body, card reading module and battery module of FIGS. 3, 4, according to the present disclosure.
Figure 7:
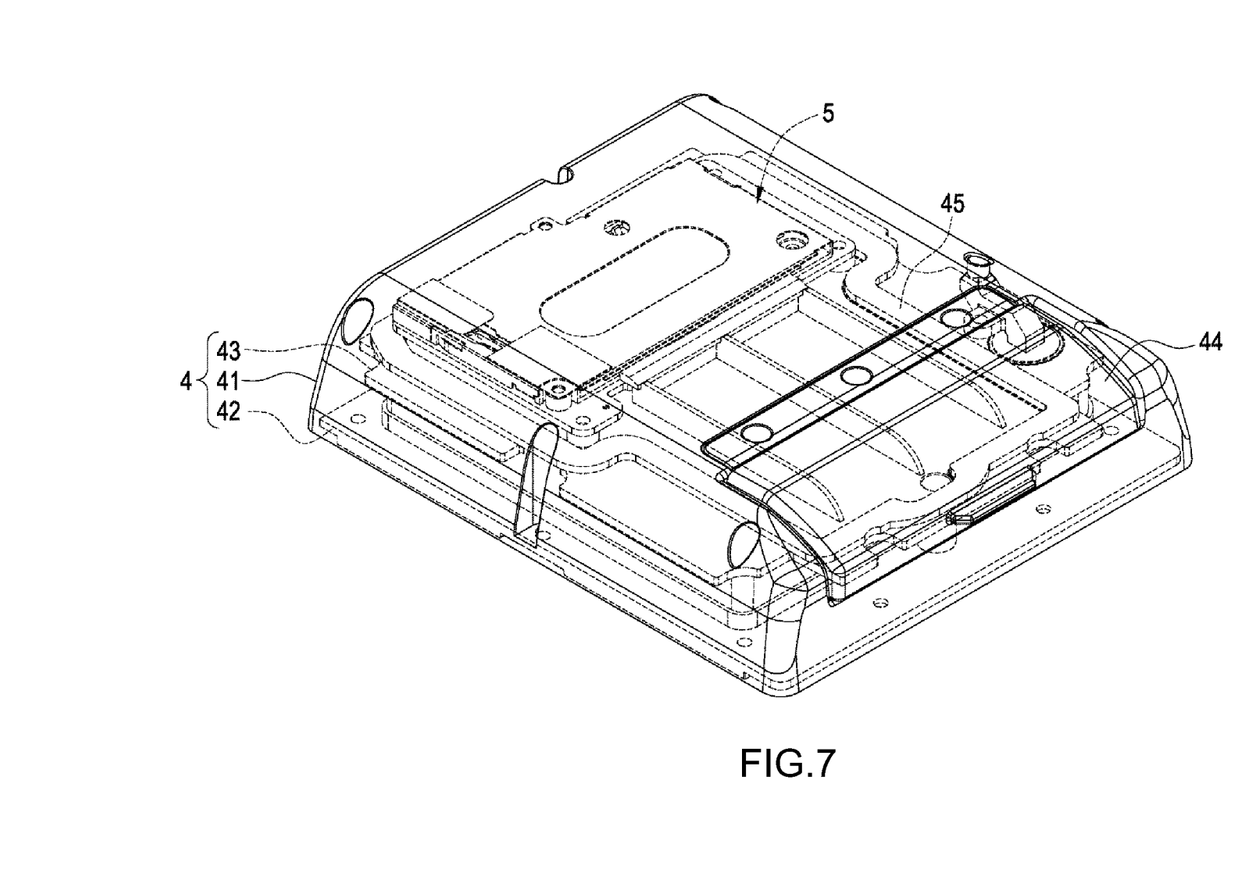
FIG. 7 is a perspective view of the expansion unit according to the present disclosure.

Preferably, as shown in FIG. 8 and FIG. 2, the back cover 3, the second casing 42, the power chamber 4b, the mask body 43, the expansion chamber 4a and the first casing 41 are sequentially stacked in a direction (for example, upward), with the first casing 41 being positioned distal to the back cover 3. The first casing 41 has the operation opening 411. The second casing 42 has the wire connection opening 421. The mask body 43 has the communication opening 4311, as shown in FIG. 5.

Figure 3:
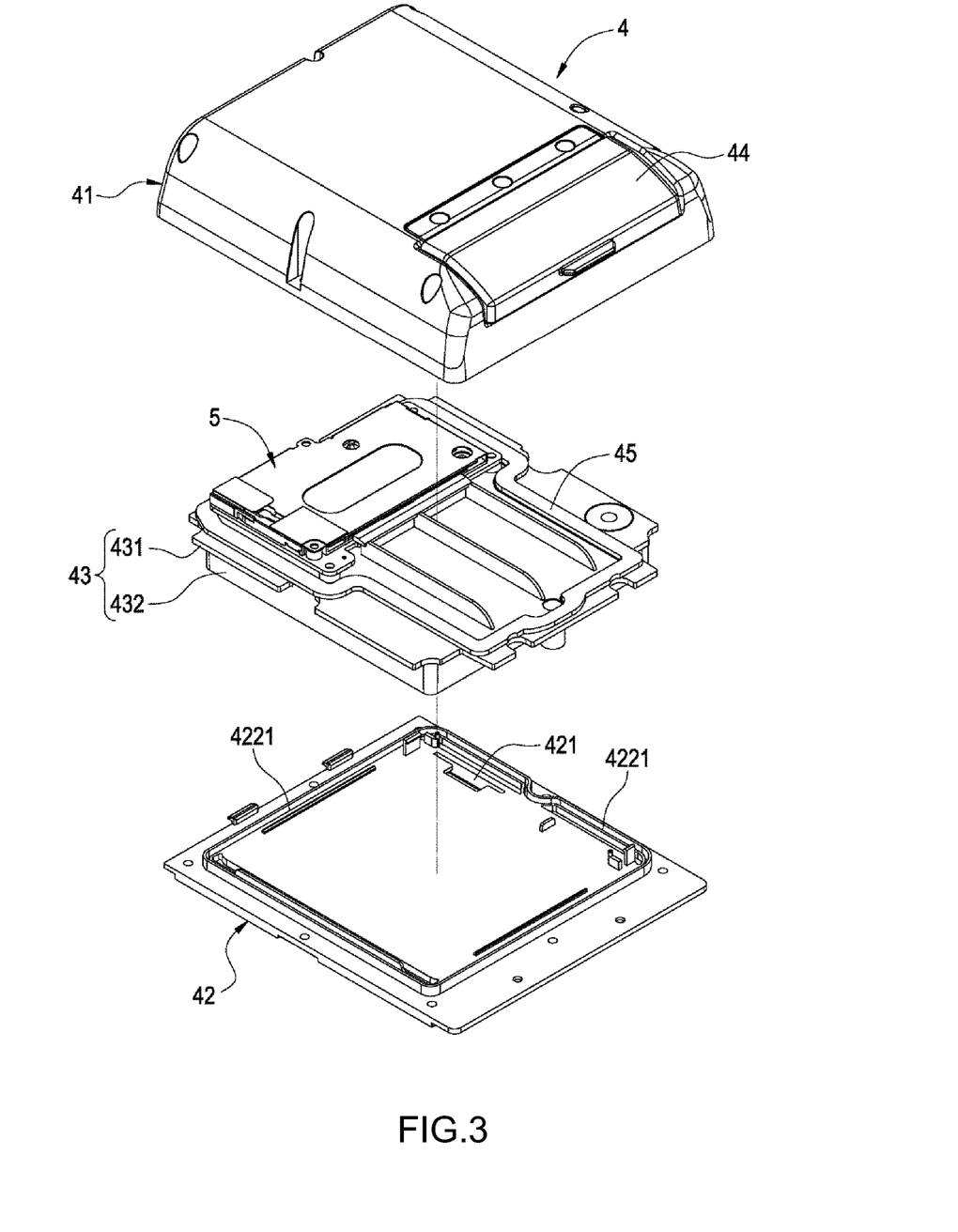
FIG. 3 is an exploded view of the expansion unit from one angle according to the present disclosure.
Figure 4:
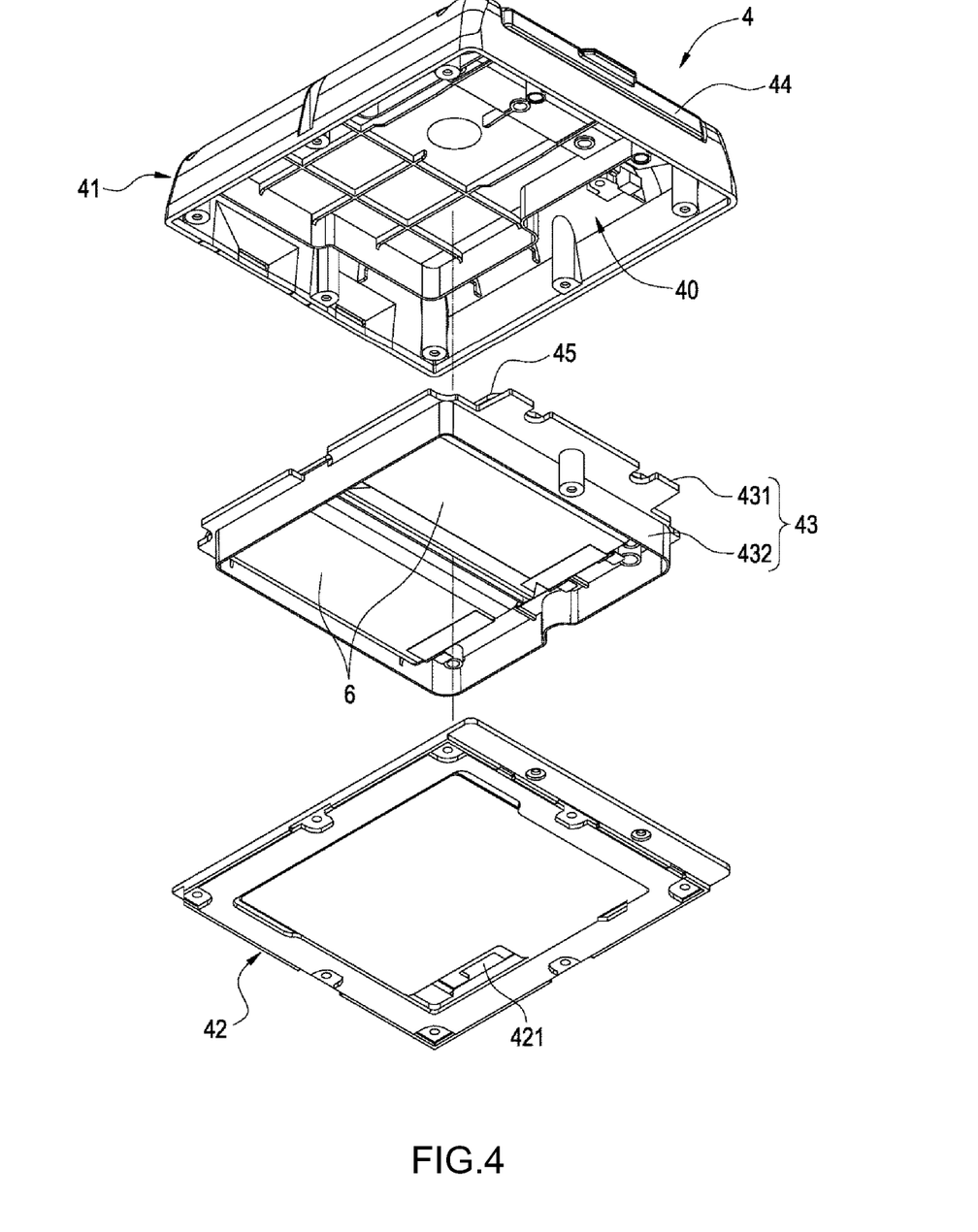
FIG. 4 is an exploded view of the expansion unit from another angle according to the present disclosure.

Referring to FIG. 3 through FIG. 8, the mask body 43 has a mask plate 431 and a wall 432 connected to the mask plate 431 peripherally and surrounding the mask plate 431. The mask body outer side 4312 is either the entire outer side of the mask body 43 and thus is equivalent to a combination of the outer side of the mask plate 431 and the outer side of the wall 432 or is only the outer side of the mask plate 431, and the present disclosure is not limited thereto. Referring to FIG. 3, a groove 4221 is disposed on an inner casing surface 422 of the second casing 42 and follows an annular path; consequently, the wall 432 of the mask body 43 is inserted into and fixed to the groove 4221 to allow the mask body 43 to cover the inner casing surface 422 of the second casing 42.

To render the expansion unit of the present disclosure waterproof, not only is it feasible for a waterproof element (not shown) to be disposed in the groove 4221 and adapted to effect waterproofness between the wall 432 and the groove 4221, but a washer 45 which is annular and made of a resilient material is also disposed at the periphery of the mask plate 431 as shown in FIG. 3 and FIG. 8. The card reading module 5 is positioned within the washer 45. A rib 412 is disposed on the first casing 41, corresponds in position to the washer 45, follows an annular path, and is raised. The rib 412 has its protruding terminal end pressing against the washer 45 in order to be fitted to the expansion box 4. At this moment, being pressed by the rib 412, the washer 45 resiliently sags, thereby effecting waterproofness.

Figure 9:
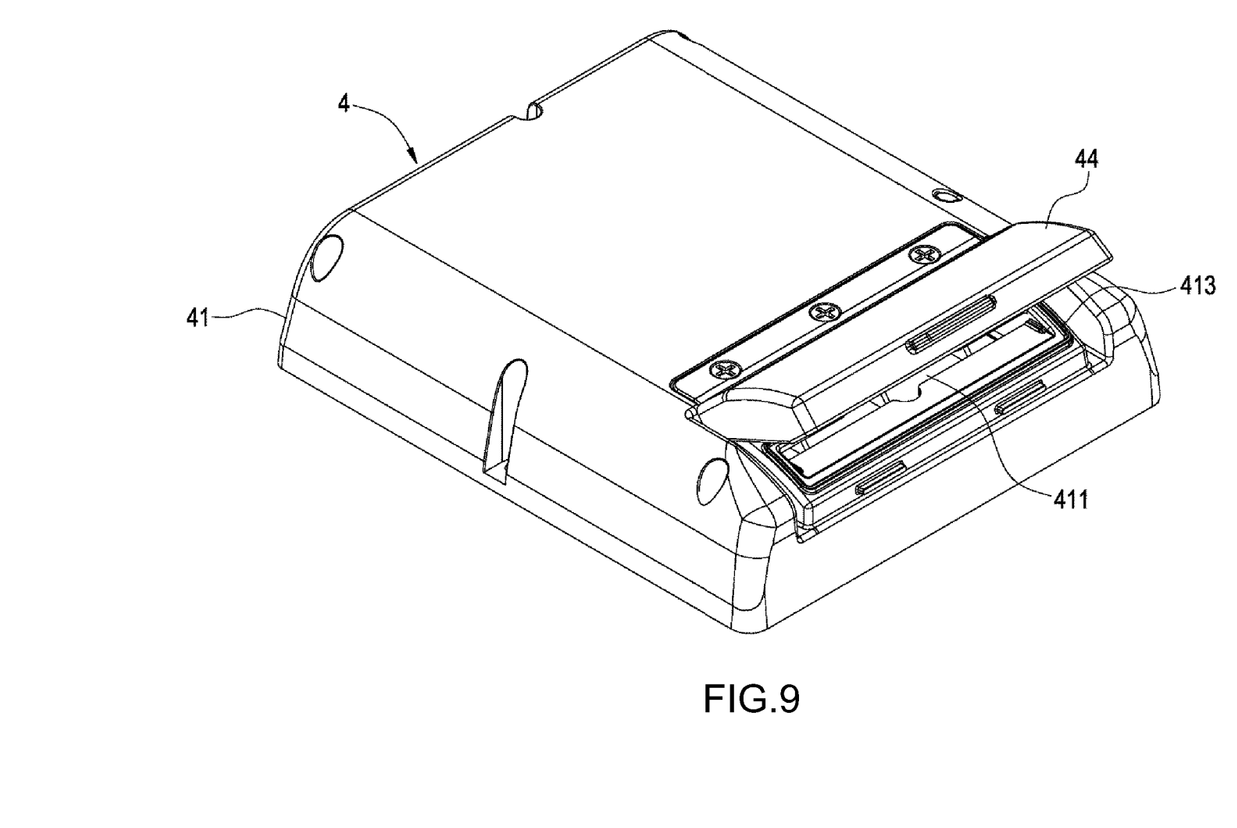
FIG. 9 is a perspective view of the expansion unit with a door cover lifted according to the present disclosure.
Figure 10:
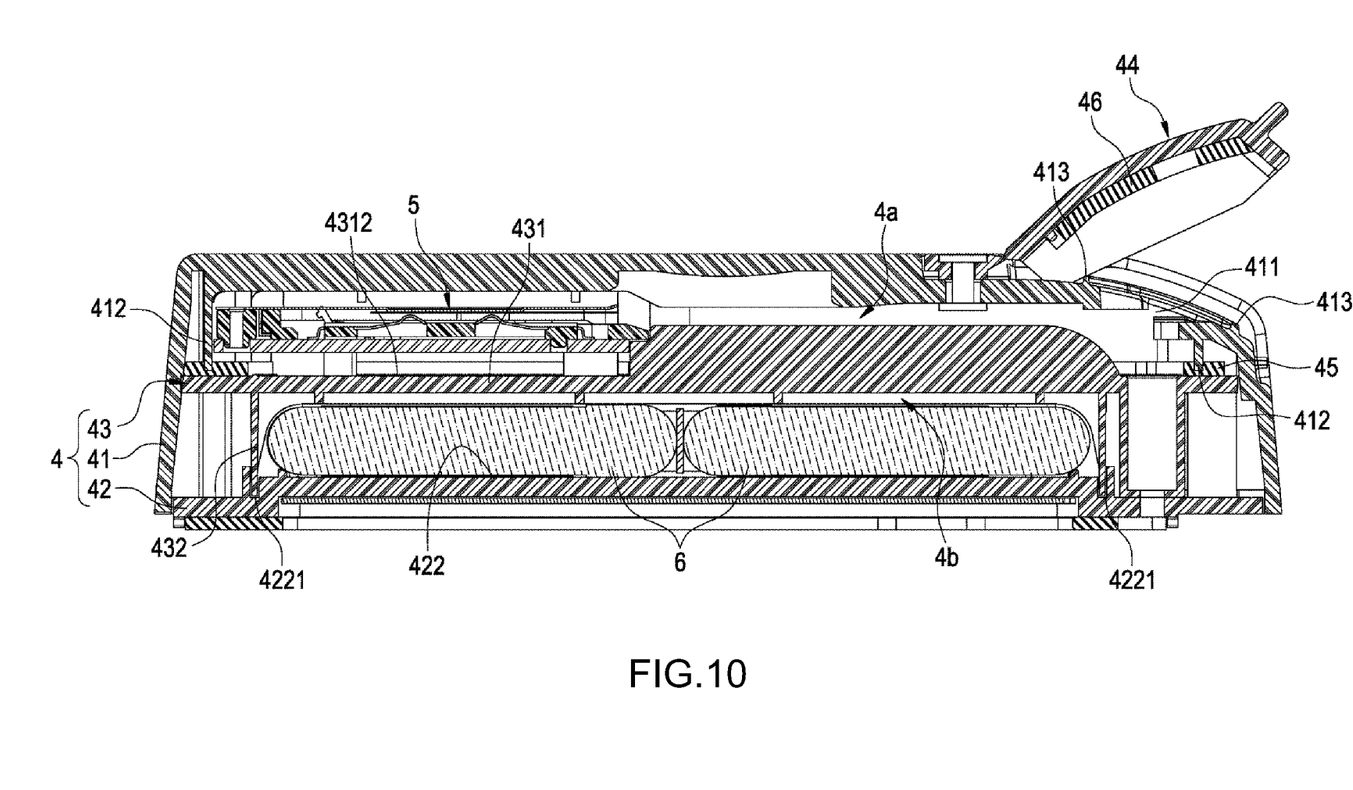
FIG. 10 is a cross-sectional view based on FIG. 9 according to the present disclosure.

Referring to FIG. 8 through FIG. 10, the operation opening 411 is exposed from the expansion box 4 in order for the operation opening 411 to be waterproof. A rib 413 is disposed on the outer side of the first casing 41, corresponds in position to the periphery of the operation opening 411, and is raised. A door cover 44 which can be lifted and in place is disposed on the expansion box 4 to cover the operation opening 411. A washer 46 is disposed on the inner surface of the door cover 44, corresponds in position to the rib 413, and is made of a resilient material. Therefore, the rib 413 will have its protruding terminal end pressing against the washer 46, provided that the door cover 44 is shut; at this moment, being pressed by the rib 413, the washer 46 resiliently sags, thereby effecting waterproofness.

Referring to FIG. 2, when the expansion box 4 is fixed to the outer cover surface 32 of the back cover 3 and corresponds in position to the expansion window 31, a washer 47 is disposed on a surface of the expansion box 4 and positioned proximate to the back cover 3, so as to effect waterproofness and dustproofness between the expansion box 4 and the periphery of the expansion window 31 of the back cover 3, that is, effecting waterproofness and dustproofness between the expansion box 4 and the back cover 3 by the washer 47.

In conclusion, the mobile electronic device of the present disclosure achieves the aforesaid objective of the present disclosure and overcomes the aforesaid drawbacks of the prior art.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent structural changes made to the aforesaid embodiments shall fall within the scope of the present disclosure. Accordingly, the legal protection for the present disclosure shall be defined by the appended claims.

What is claimed is:
1. A mobile electronic device, comprising:
a main framework having a motherboard;
a back cover covering the main framework and having an expansion window;
an expansion box disposed at the back cover, corresponding in position to the expansion window, having therein an expansion chamber and a power chamber, being in communication with a communication opening between the expansion chamber and the power chamber, having an operation opening in communication with the expansion chamber, and having a wire connection opening in communication with the power chamber, the wire connection opening being in communication with the expansion window, wherein the power chamber is located between the main framework and the expansion chamber;

a card reading module disposed in the expansion chamber and connected to the motherboard by a signal wire via the communication opening and the wire connection opening; and a battery module disposed in the power chamber and connected to the motherboard by a power wire via the wire connection opening.

2. The mobile electronic device of claim 1, wherein the back cover has an exposed outer cover surface, and the expansion box is fixed to the outer cover surface.

3. The mobile electronic device of claim 1, wherein the operation opening is exposed from the expansion box and covered with a door cover.

4. The mobile electronic device of claim 1, further comprising a touch panel, wherein the main framework has two opposing framework surfaces, one of which is covered with the back cover, and the touch panel is disposed on the other framework surface.

5. The mobile electronic device of claim 1, wherein the expansion box comprises a first casing, a second casing and a mask body, with the first and second casings being coupled together to form an intrabox space in which the mask body covers the second casing to form the power chamber between an inner side of the mask body and the second casing, and the expansion chamber is formed between the first casing and an outer side of the mask body.

6. The mobile electronic device of claim 5, wherein the back cover, the second casing, the power chamber, the mask body, the expansion chamber and the first casing are sequentially stacked, the first casing having the operation opening, the second casing having the wire connection opening, and the mask body having the communication opening.

7. The mobile electronic device of claim 5, wherein the card reading module is disposed on the outer side of the mask body.

8. The mobile electronic device of claim 5, wherein the mask body has a mask plate and a wall connected to the mask plate peripherally and surrounding the mask plate, a groove is disposed on an inner casing surface of the second casing, and the wall of the mask body is inserted into the groove to allow the mask body to fixedly cover the second casing.

9. The mobile electronic device of claim 8, wherein the groove has therein a waterproof element for effecting waterproofness between the wall and the groove.

10. The mobile electronic device of claim 5, wherein the second casing is at least partially located between the power chamber and the back cover, the mask body is located between the expansion chamber and the power chamber, and the expansion chamber, the mask body and the power chamber are located between the first casing and the second casing.

11. A mobile electronic device, comprising:
a main framework having a motherboard;
a back cover covering the main framework and having an expansion window;
an expansion box disposed at the back cover, corresponding in position to the expansion window, having therein an expansion chamber and a power chamber, being in communication with a communication opening between the expansion chamber and the power chamber, having an operation opening in communication with the expansion chamber, and having a wire connection opening in communication with the power chamber, the wire connection opening being in communication with the expansion window, wherein the power chamber is located between the main framework and the expansion chamber, wherein the wire connection opening directly faces the expansion window;
a card reading module disposed in the expansion chamber and connected to the motherboard by a signal wire via the communication opening and the wire connection opening; and
a battery module disposed in the power chamber and connected to the motherboard by a power wire via the wire connection opening.

12. The mobile electronic device of claim 11, wherein the back cover has an exposed outer cover surface, and the expansion box is fixed to the outer cover surface.

13. The mobile electronic device of claim 11, wherein the operation opening is exposed from the expansion box and covered with a door cover.

14. The mobile electronic device of claim 11, further comprising a touch panel, wherein the main framework has two opposing framework surfaces, one of which is covered with the back cover, and the touch panel is disposed on the other framework surface.

15. The mobile electronic device of claim 11, wherein the expansion box comprises a first casing, a second casing and a mask body, with the first and second casings being coupled together to form an intrabox space in which the mask body covers the second casing to form the power chamber between an inner side of the mask body and the second casing, and the expansion chamber is formed between the first casing and an outer side of the mask body.

16. The mobile electronic device of claim 15, wherein the second casing is at least partially located between the power chamber and the back cover, the mask body is located between the expansion chamber and the power chamber, and the expansion chamber, the mask body and the power chamber are located between the first casing and the second casing.

17. The mobile electronic device of claim 15, wherein the back cover, the second casing, the power chamber, the mask body, the expansion chamber and the first casing are sequentially stacked, the first casing having the operation opening, the second casing having the wire connection opening, and the mask body having the communication opening.

18. The mobile electronic device of claim 15, wherein the card reading module is disposed on the outer side of the mask body.

19. The mobile electronic device of claim 15, wherein the mask body has a mask plate and a wall connected to the mask plate peripherally and surrounding the mask plate, a groove is disposed on an inner casing surface of the second casing, and the wall of the mask body is inserted into the groove to allow the mask body to fixedly cover the second casing.

20. The mobile electronic device of claim 19, wherein the groove has therein a waterproof element for effecting waterproofness between the wall and the groove.

* * * * *